Jan. 1, 1946.  V. W. GIDEON  2,392,039
ADJUSTABLE CHUCK
Filed April 17, 1944  2 Sheets-Sheet 1
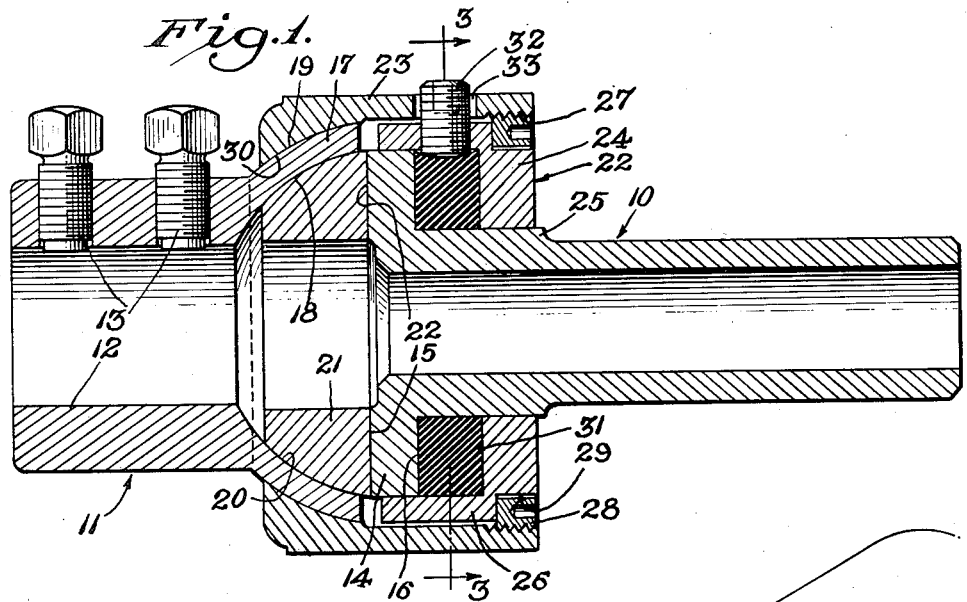
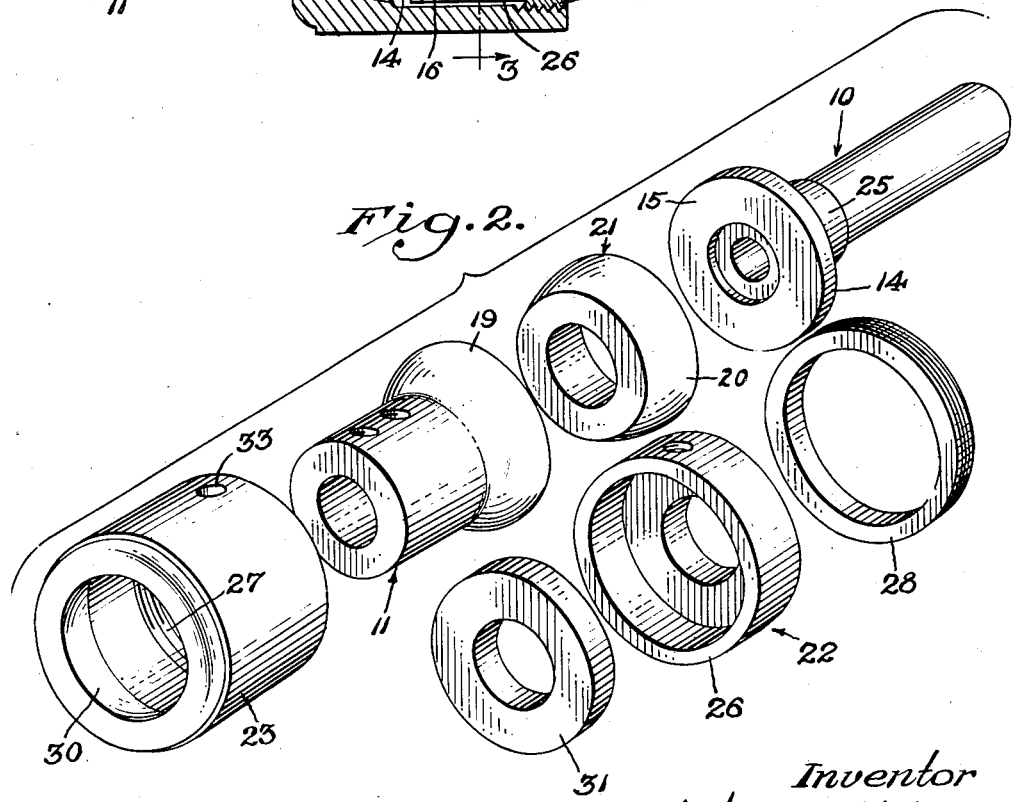
Inventor
Victor W. Gideon
By Carlson, Pitzner,
Hubbard & Wolfe
Attorneys.

Jan. 1, 1946.  V. W. GIDEON  2,392,039
ADJUSTABLE CHUCK
Filed April 17, 1944  2 Sheets-Sheet 2

Inventor
Victor W. Gideon
BY
Carlson, Pitzner,
Hubbard & Woze
Attorneys.

Patented Jan. 1, 1946

2,392,039

UNITED STATES PATENT OFFICE 2,392,039

ADJUSTABLE CHUCK

Victor W. Gideon, Chicago, Ill., assignor to Victor W. Gideon, Hubert W. Jerry, Lauretta F. Gideon, and Louise C. Jerry, copartners doing business as Par Manufacturing Co., Chicago, Ill.

Application April 17, 1944, Serial No. 531,398

9 Claims. (Cl. 279—16)

The invention relates to adjustable chucks and has its general aim the provision of a new and improved device of this nature particularly suited for supporting a tool in exact alinement with the portion of a workpiece to be cut.

In certain machining operations (for example reaming) the tool is fixed and the workpiece is rotated relative thereto effect the cutting operation. For such operations, the tool is ordinarily mounted on a stationary tool support forming a part of a machine tool and the workpiece is mounted on the rotatably driven spindle of the machine. Exactly alinement of the axes of the tool and workpiece are essential for precision work but it is not uncommon to find that the centers of the tool support and the work spindle are out of line either laterally or angularly or both.

An object of the invention is to provide a chuck for supporting a tool in operative position which embodies new and improved means for adjustably determining the position of the tool to fix it in exact alinement with the work spindle or a workpiece carried thereon.

In conjunction with the foregoing, another object is to provide novel means utilizing pressure applied through a confined and readily deformable body of resilient material, such, for example, as rubber, for clamping the tool in any adjusted position.

Another object, more specifically stated, is to provide a device of this character wherein the tool is supported by means that permits of universal angular adjustment and in turn is carried by radially adjustable means, the adjusted position determined by either or both of said means being maintained by a single securing means.

A further object is to provide a device of this character which is simple in construction and by which the required accuracy of alinement may be quickly obtained.

Other objects and advantages of the invention will become apparent in the following description and from the accompanying drawings in which:

Figure 1 shows in axial section an adjustable tool chuck embodying the features of the invention.

Fig. 2 is an exploded view illustrating in perspective the component parts of the chuck.

Figure 3:
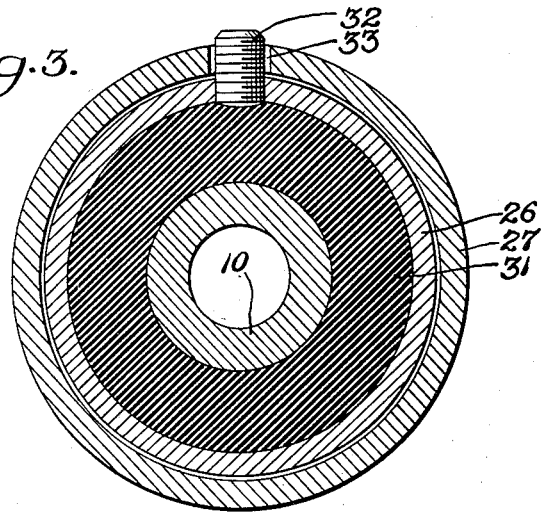
Fig. 3 is a cross-sectional view through the chuck taken substantially along the line 3—3 of Fig. 1.

One exemplary form of device is shown in Figs. 1 to 3, inclusive. The numeral 10 therein designates generally a shank member through which the chuck is adapted to be secured in any suitable manner to the tool support of a machine tool. The chuck shank 10 carries suitable means for rigid engagement with the shank of a tool (not shown) such, for example, as the socket member indicated at 11 which has a socket 12 to receive the tool shank and one or more set screws 13 for securing the tool shank in the socket.

The socket member 11 and the shank 10 are, according to one aspect of the present invention, connected together by means which permits the axes of the shank and the socket to be adjustably related either in lateral or radial direction or angularly or both. To this end the inner end of the shank 10 has a radially outstanding flange 14 providing an outer end face 15 directed toward the socket and oppositely directed inner end face 16, said faces being substantially parallel and extending generally transaxially of the shank. The socket member 11, at its inner end, has an outwardly flaring wall or flange 17 formed with an inner concave arcuate surface 18 and a convex outer arcuate surface 19, both arcuate surfaces being preferably formed on the same center. Complementing the arcuate surface 18 is a convex surface 20 formed on a head 21 which is in the shape of a rather thick annulus arranged to fit into the cup-shaped depression or recess defined by the flange 17. When thus fitted, the dimension of the head 21 locates its outer end surface 22 slightly beyond the end of the flange 17 as shown in Fig. 1. The surface 22 complements the outer end face 15 on the shank flange 14 for abutting engagement therewith.

The engagement between the flange 17 on the socket member 11 and the head 21 forms, in effect, a universal ball and socket joint by which the angular position of the axis of the socket member 11 may be adjusted in any direction with respect to the axis of the shank 10. Lateral adjustment of the socket member 11 relative to the shank 10 is effected by sliding the head 21 radially along the face 15 of the flange 14, such adjustment being entirely independent of the angular position of the socket member.

Means is provided for retaining the member 11 and head 21 in assembled relation with the shank 10 and for rigidly clamping the parts together in any position of adjustment. The retaining means, in its preferred form, comprises a collar 22 axially slidably telescoped on the shank 10 in opposed relation to the rear face 16 of the flange 14 and a sleeve member 23 operatively connected with the collar and coacting with the flange 17 of the member 11 to hold it in engagement with the head 21.

As herein shown, the collar 22 is generally cup-shaped in form and its end wall 24 is centrally apertured to receive the shank 10 which may be formed with an accurately machined shoulder portion 25 to insure a tight sliding fit between the parts. The side wall of the collar comprises a cylindrical flange 26 extending axially from the end wall 24 and overlies the peripheral edge portion of the flange 14. The collar and flange thus define a closed annular chamber of variable capacity which, in this instance, is utilized for clamping the parts together as will appear presently.

The sleeve member 23 is arranged to encircle the collar 22 and extend forwardly therefrom over the flange 17 of the member 11. As herein shown, the sleeve is internally threaded as at 27 adjacent its rear end to receive a locking ring 28 adapted to seat in a rabbeted groove 29 in the rear face of the end wall 24 of the collar. The locking ring is adapted to engage the axial face of the groove 29 and thus provide an operative connection between the collar and the sleeve. Internally, the ring is dimensioned so as to provide substantial clearance from the radial face of the groove. By reason of this clearance and, since the portion of the sleeve 23 overlying the collar 22 is formed with an internal diameter somewhat greater than the external diameter of the collar, a substantial radial movement of the sleeve relative to the shank 10 is permitted.

At its forward end, the sleeve 23 is reduced in diameter and formed with an inwardly and rearwardly facing concave bearing surface 30 complemental to and engageable with the convex bearing surface 19 of the flange 17. The sleeve thus constitutes the outer member of the ball and socket joint of which the flange 17 and head 21 constitute the inner members. The joint thus provided permits universal angular adjustment of the member 11 with reference to the longitudinal axis of the shank 10. Moreover, the various parts of the chuck are held in assembled relation and may be securely clamped together by shifting the sleeve 23 rearwardly relative to the shank.

Pressure is applied for shifting the sleeve rearwardly, i. e., in a clamping direction, by deforming a body of resilient material confined in a chamber defined between the opposed faces of the collar 22 and flange 14. In the illustrative construction, a ring 31 of rubber (either natural or synthetic) is so confined. Solids other than rubber but having similar characteristics of flow or deformation and resiliency may be used of course.

The body 31 is dimensioned so as to completely fill the space between the radial face of the shank 10 and the inner surface of the wall 26 and is of such thickness that the collar is normally held in a position to permit easy lateral movement of the sleeve relative thereto as well as angular movement of the member 11 in the ball and socket joint. Adjustment of the longitudinal play of the collar may be effected by screwing the locking ring 28 into or out of the sleeve as required.

To effect a clamping action, a compressive force is applied to the body 31 and is thereupon transmitted by the body uniformly against the walls of the chamber in which it is confined. As the side wall 26 of the chamber is unyielding, the pressure exerted axially of the body acts to force the collar 22 away from the flange 14 thus drawing the sleeve 27 rearwardly with respect to the shank 10. Such rearward movement of the sleeve is effective through the bearing surfaces 30 and 19 to clamp the flange 17 securely to the head 21 and also to clamp the head to the face of the flange 14. Sufficient force can be applied very easily to rigidly clamp the parts in any adjustable position.

In the particular chuck illustrated, the compressive force is applied radially to the body 31 by a plug 32 screw threaded into an aperture in the side wall 26 of the collar. The plug is arranged to project through a clearance hole 33 in the sleeve 27 and its outer end is shaped for engagement with a wrench or other suitable tool by which it may be turned.

In operation, the chuck is ordinarily mounted on the tool support of a machine tool with a tool such as a reamer clamped in the socket member 11. To adjust the tool into precise alinement with the work, the plug 32 is backed off to relieve the pressure on the body 31 thus releasing the parts for relative adjustment. With a precisely bored workpiece or an accurately dimensioned gauge mounted in the work holder of the machine tool, the member 11 may be adjusted to obtain precise angular alinement of the tool with the work and the socket member together with the head 21 and sleeve 27 may be shifted radially as required to obtain the required axial alinement. Thereafter, the alinement is effectually maintained by screwing in the plug 32 to compress the body 31 and thereby force the collar 22 and sleeve 27 rearwardly to the clamping position.

Figure 4:
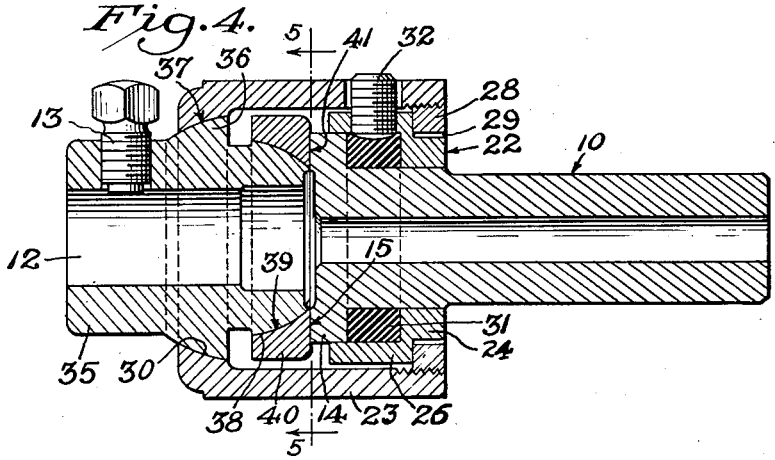
Fig. 4 is an axial sectional view of a modified form of construction.
Figure 5:
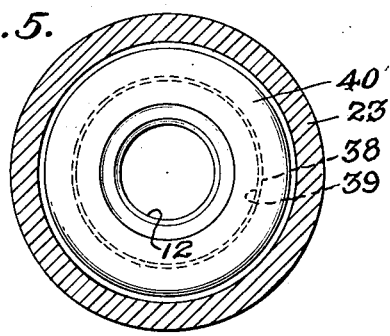
Fig. 5 is a cross-sectional view through the modified form taken substantially on the line 5—5 of Fig. 4.

The modified form of the chuck shown in Figs. 4 and 5 utilizes a shank 10, collar 22 and sleeve 23 exactly like those of the preferred form heretofore described. A socket member 35, having a tool receiving socket 12 and a set screw 13 for securing the tool in the socket, is also provided. Intermediate its ends, the member 35 is provided with a radially extending flange 36 formed with a convex forwardly facing arcuate bearing surface 37 complemental to the bearing surface 30 of the sleeve 23 and engageable therewith.

At its inner end, the socket member 33 is formed with a rearwardly facing convex arcuate bearing surface 38 engageable in a complemental concave bearing surface 39 formed in a head 40 having a flat face 41 in bearing engagement with the face 15 of the flange 14. Preferably, the arcuate surfaces 30, 37, 38 and 39 are all formed on a common center thus forming a ball and socket joint allowing universal angular adjustment of the member 35 with respect to the longitudinal axis of the shank 10. Radial adjustment of the member 35 is effected through the sliding of the head 40 laterally on the flange 14.

The parts of the chuck are securely clamped in adjusted positions in the manner heretofore described by screwing in the plug 32 to apply pressure to the body 31. As in the preferred form of the tool, the body 31 acts to shift the collar 22 rearwardly and thus draw the sleeve 23 to the clamping position.

It will be apparent from the foregoing that the invention provides a chuck of novel and advantageous construction. By reason of the novel form and relationship of the parts, a tool held in the chuck is universally adjustable, that is, it may be adjusted both angularly and laterally to insure precise alinement with the workpiece to be operated on. Accurate alinement of the tool and work is effectually maintained by novel clamping mechanism utilizing pressure transmitted uniformly through a confined resilient body and operable to secure the parts together rigidly in any adjusted position. The improved chuck is simple in construction, yet efficient and reliable in operation. Moreover, adjustments may be effected very easily and, since the adjustable parts are subject to little wear, dependable, accurate service over a long period is insured.

I claim as my invention:

1. In an adjustable tool chuck, the combination of a shank adapted to be mounted on a machine tool, a flange on one end of said shank presenting a flat face substantially perpendicular to the axis of said shank, a head having opposed flat and convex bearing surfaces, the flat surface of said head being engageable with and slidable radially on the face of said flange, a socket member having at one end a bearing surface complemental to the convex bearing surface of said head and being universally adjustable thereon, a collar slidably mounted on said shank at the rear of said flange, a sleeve member fixed to said collar and extending over said flange and engaging said one end of said socket member, a deformable body of resilient material confined within and substantially filling the space between said collar and said flange, and means operable to apply pressure to said body, said body acting to transmit the applied pressure through said collar to said sleeve to clamp said socket member and said head in fixed positions of adjustment with respect to said shank.

2. In an adjustable tool chuck, the combination of a shank adapted to be mounted on a machine tool, a flange on one end of said shank presenting a flat face substantially perpendicular to the axis of said shank, a socket member having one end flared outwardly to present opposed axially facing concave and convex bearing surfaces, a head supported on said shank for radial adjustment and having a convex bearing surface adapted to seat the concave bearing surface of said member, a sleeve encircling said shank and said member and having an axially facing concave bearing surface engageable with the convex bearing surface of said member, said bearing surfaces permitting universal angular adjustment of said member relative to said shank, and means for drawing said sleeve axially of said shank to frictionally clamp the parts together.

3. In an adjustable tool chuck, the combination with a shank adapted to be mounted on a machine tool, a socket member, a head adjustable radially of said shank, a sleeve encircling said shank and said head, said sleeve, said head and said member having cooperating bearing surfaces forming a ball and socket joint providing universal angular adjustment of said member relative to said shank, a collar slidably mounted on said shank and operatively connected with said sleeve, means on said shank cooperating with said collar to form a closed chamber, a resilient body disposed in said chamber, and means for applying pressure to said body, said body transmitting said pressure through said collar to said sleeve to frictionally clamp said member and said head in fixed positions with respect to said shank.

4. In an adjustable tool chuck, the combination with a shank adapted to be mounted on a machine tool, a socket member, a head adjustable radially of said shank, a sleeve encircling said shank and said head, said sleeve, said head and said member having cooperating bearing surfaces forming a ball and socket joint providing universal angular adjustment of said member relative to said head, a collar slidably supported on said shank, means providing a connection between said collar and said sleeve, and means acting on said sleeve and operable through said connection to shift said sleeve in a direction to frictionally clamp the interengaging bearing surfaces together.

5. In an adjustable tool chuck, the combination with a shank adapted to be mounted on a machine tool, a socket member, a head adjustable radially of said shank, a sleeve encircling said shank and said head, said sleeve, said head and said member having cooperating bearing surfaces forming a ball and socket joint providing universal angular adjustment of said member relative to said head, and means interposed between said sleeve and said shank operable to shift said sleeve in a direction to frictionally clamp said member to said head and said head to said shank.

6. In a chuck, the combination with a shank having a retaining structure slidably supported thereon, said shank and said retaining structure presenting opposed surfaces extending substantially transaxially of said shank, of means including a body of resilient material confined between said surfaces and substantially filling the space between them, and means for applying a compressive force to said body to shift said retaining structure axially of said shank.

7. In an adjustable chuck, the combination of a socket member, a shank member, means connecting said socket member with said shank member and providing an angular adjustment for varying the angular relationship of the axes of said socket member and shank and a radial adjustment for varying the position of the axis of the socket member radially relative to the axis of said shank, and means including a resilient body for rigidly clamping the parts aforesaid together.

8. In an adjustable tool chuck, in combination, an elongated shank having at one end a flat face substantially perpendicular to the axis of the shank, a socket member having an inner concave bearing surface and an outer convex bearing surface formed on a common center, a bearing member interposed between said socket member and said shank having a convex bearing surface engageable with the concave surface of the socket member and a plane bearing surface engageable with the flat face of said shank and slidably adjustable thereon transaxially of the shank, a sleeve member extending over the adjacent ends of said socket member and said shank and having a concave bearing surface engageable with the convex bearing surface of the socket member, and means interposed between said sleeve member and said shank operable to shift said sleeve member axially of the shank to clamp the socket member rigidly in fixed position with respect to the shank, said shifting means permitting adjustment of said sleeve transversely of said shank to conform to the adjusted positions of said socket member and said bearing member transaxially of the shank.

9. In an adjustable tool chuck, in combination, an elongated shank adapted to be mounted on a machine tool, a socket member, a bearing member interposed between said socket member and said shank and adjustable transaxially of said shank, a sleeve extending over the adjacent ends of said socket member and said shank, said sleeve, said bearing member and said socket member having cooperating bearing surfaces forming a ball and socket joint providing universal angular adjustment of said socket member relative to said shank, and means connecting said sleeve with said shank operable to shift the sleeve axially of the shank to clamp said socket member and said bearing member to the shank in selected positions of adjustment, said connecting means permitting adjustment of said sleeve transversely of said shank to conform to the adjusted positions of said bearing member and said socket member on the shank.

VICTOR W. GIDEON.